United States Patent
Li et al.

(10) Patent No.: US 7,689,171 B2
(45) Date of Patent: Mar. 30, 2010

(54) REDUCING INTERFERENCE IN A WIRELESS NETWORK VIA ANTENNA SELECTION

(75) Inventors: Guoqing C. Li, Portland, OR (US); Srikathyayani Srikanteswara, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 11/563,572

(22) Filed: Nov. 27, 2006

(65) Prior Publication Data
US 2008/0125047 A1 May 29, 2008

(51) Int. Cl.
H04K 3/00 (2006.01)
H04B 1/00 (2006.01)
H04B 15/00 (2006.01)
H04W 4/00 (2009.01)

(52) U.S. Cl. .................. 455/63.1; 455/63.4; 455/562.1; 455/1

(58) Field of Classification Search ................ 455/63.1, 455/63.4, 1, 13.3, 25, 562.1
See application file for complete search history.

(56) References Cited

U.S. PATENT DOCUMENTS

| 5,790,587 | A | 8/1998 | Smith et al. | |
|---|---|---|---|---|
| 6,240,290 | B1 | 5/2001 | Willingham et al. | |
| 6,487,423 | B1* | 11/2002 | Johansson | 455/562.1 |
| 6,603,958 | B1 | 8/2003 | Gao et al. | |
| 6,850,741 | B2 | 2/2005 | Lei et al. | |
| 6,885,847 | B1 | 4/2005 | Lumelsky | |
| 6,892,054 | B2* | 5/2005 | Belcher et al. | 455/63.1 |
| 7,119,745 | B2 | 10/2006 | Gaucher et al. | |
| 7,269,198 | B1 | 9/2007 | Elliott et al. | |
| 7,308,270 | B2* | 12/2007 | Lastinger et al. | 455/450 |
| 7,349,436 | B2 | 3/2008 | Maltsev et al. | |
| 2002/0086708 | A1 | 7/2002 | Teo et al. | |
| 2003/0032403 | A1* | 2/2003 | Ono | 455/273 |
| 2003/0123420 | A1* | 7/2003 | Sherlock | 370/338 |
| 2004/0106436 | A1* | 6/2004 | Ochi et al. | 455/562.1 |

(Continued)

FOREIGN PATENT DOCUMENTS

EP 0952747 A2 10/1999

(Continued)

OTHER PUBLICATIONS

Smulders, "Exploiting the 60GHz Band for Local Wireless Multimedia Access: Prospects and Future Directions," IEEE Communications Magazine, Jan. 2002, pp. 140-147.

(Continued)

*Primary Examiner*—Vincent P Harper
*Assistant Examiner*—Marivelisse Santiago-Cordero
(74) *Attorney, Agent, or Firm*—Schwabe, Williamson & Wyatt, P.C.

(57) ABSTRACT

Apparatus and method for reducing or avoiding at least in part one or more interferences in a wireless communication device are described herein. The method may include initially sensing by the device an interference from an interference source received by one or more of a plurality of sector antennas of the device. The device may then select, based at least in part on the sensing, a subset of the plurality of sector antennas for communicating with other devices in the wireless network.

21 Claims, 4 Drawing Sheets

U.S. PATENT DOCUMENTS

| | | |
|---|---|---|
| 2004/0224719 A1 | 11/2004 | Nounin et al. |
| 2005/0078707 A1 | 4/2005 | Maltsev et al. |
| 2005/0095996 A1 | 5/2005 | Takano |
| 2005/0249151 A1 | 11/2005 | Takano |
| 2007/0091988 A1 | 4/2007 | Sadri et al. |
| 2007/0099668 A1 | 5/2007 | Sadri et al. |
| 2007/0135042 A1* | 6/2007 | Shiff et al. ................ 455/13.3 |
| 2007/0232235 A1 | 10/2007 | Li et al. |
| 2007/0238480 A1 | 10/2007 | Li et al. |
| 2007/0280332 A1 | 12/2007 | Srikanteswara et al. |
| 2007/0297365 A1 | 12/2007 | Li et al. |
| 2008/0085738 A1 | 4/2008 | Li et al. |
| 2008/0117865 A1 | 5/2008 | Li et al. |

FOREIGN PATENT DOCUMENTS

| | | |
|---|---|---|
| EP | 1006668 A1 | 6/2000 |
| EP | 1056304 A2 | 11/2000 |
| EP | 1158686 A1 | 11/2001 |
| EP | 1261142 A1 | 11/2002 |
| EP | 1392073 A1 | 2/2004 |
| GB | 2317786 | 4/1998 |
| GB | 2363256 A | 12/2001 |
| WO | WO95/09490 | 4/1995 |
| WO | WO96/07108 | 3/1996 |
| WO | WO99/22531 | 5/1999 |
| WO | WO2004/054153 A2 | 6/2004 |

OTHER PUBLICATIONS

"International Search report and Written Opinion Received," PCT/US2007/080741, (Feb. 4, 2008), pp. 1-10.

Bandyopadhyay, et al., "An Adaptive MAC and Directional Routing Protocol for Ad Hoc Wireless Network Using ESPAR Antenna," ATR Adaptive Communications Research Laboratories, 2000.

* cited by examiner

REDUCING INTERFERENCE IN A WIRELESS NETWORK VIA ANTENNA SELECTION

TECHNICAL FIELD

Embodiments of the present invention relate to the field of data communication, more specifically, to reducing interference in a wireless network.

BACKGROUND

The development and popularity of wireless communication in recent years have resulted in wireless local area networks (WLANs) becoming more and more prevalent. A WLAN typically comprises a number of nodes including one or more access points (APs) and stations (STAs). The nodes may be any type of wireless communication devices such as desktop computers, laptop computers, set-top boxes, personal digital assistants (PDAs), web tablets, and so forth.

The nodes in these WLANs (or simply wireless networks) will typically operate in accordance with a communication standard such as the Institute of Electrical and Electronic Engineers (IEEE) 802.11x standards including, for example, IEEE 802.11a standard (IEEE std. 802.11a, published 1999) or IEEE 802.11b standard (IEEE std. 802.11b, published 1999). The 802.11x standards are basically carrier sense multiple access (CSMA) based medium access schemes. Because these nodes (i.e., wireless devices) operate in accordance with CSMA based medium access schemes, the wireless devices' performances are subject to the interference level of the wireless networks. That is, any interference may cause a wireless device to back off from transmitting signals in a wireless network and may significantly affect the wireless device's performance. For example, some wireless devices may communicate in a wireless network using one of the unlicensed bands such as the 2.4 GHz frequency band. Unfortunately, certain electronic devices may act as interference sources because they generate signals within the 2.4 GHz spectrum. Examples of such interference sources include, for example, microwave ovens, cordless telephones, Bluetooth, and so forth. Even worldwide interoperability for microwave access (WiMAX) devices may use an adjacent frequency band and its signals may leak into the 2.4 GHz band as interference. Thus, communication between wireless devices operating in the 2.4 GHz frequency band or other frequency bands may be interrupted from interference produced by such interference sources, particularly when the interference sources are located in the vicinity of the wireless devices.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

According to various embodiments of the present invention, devices and methods for communicating in a wireless network are provided that may avoid, at least in part, one or more interferences from one or more interference sources during communication in the wireless network. For the embodiments, the devices may include, among other things, a plurality of sector antennas, a spectrum sensing module, and an antenna selection module. In brief, the sector antennas may be designed to communicate (i.e., transmit and/or receive signals) in the wireless network. The spectrum sensing module may be coupled to the sector antennas and may be adapted to sense one or more interferences received by one or more of the plurality of sector antennas. Based at least in part on the sensing performed by the spectrum sensing module, the antenna selection module may select a subset of the sector antennas to communicate with other devices of the wireless network to avoid, at least in part, selected one(s) of the one or more interferences. These and other aspects of various embodiments of the present invention will be described in greater detail below.

Figure 1:
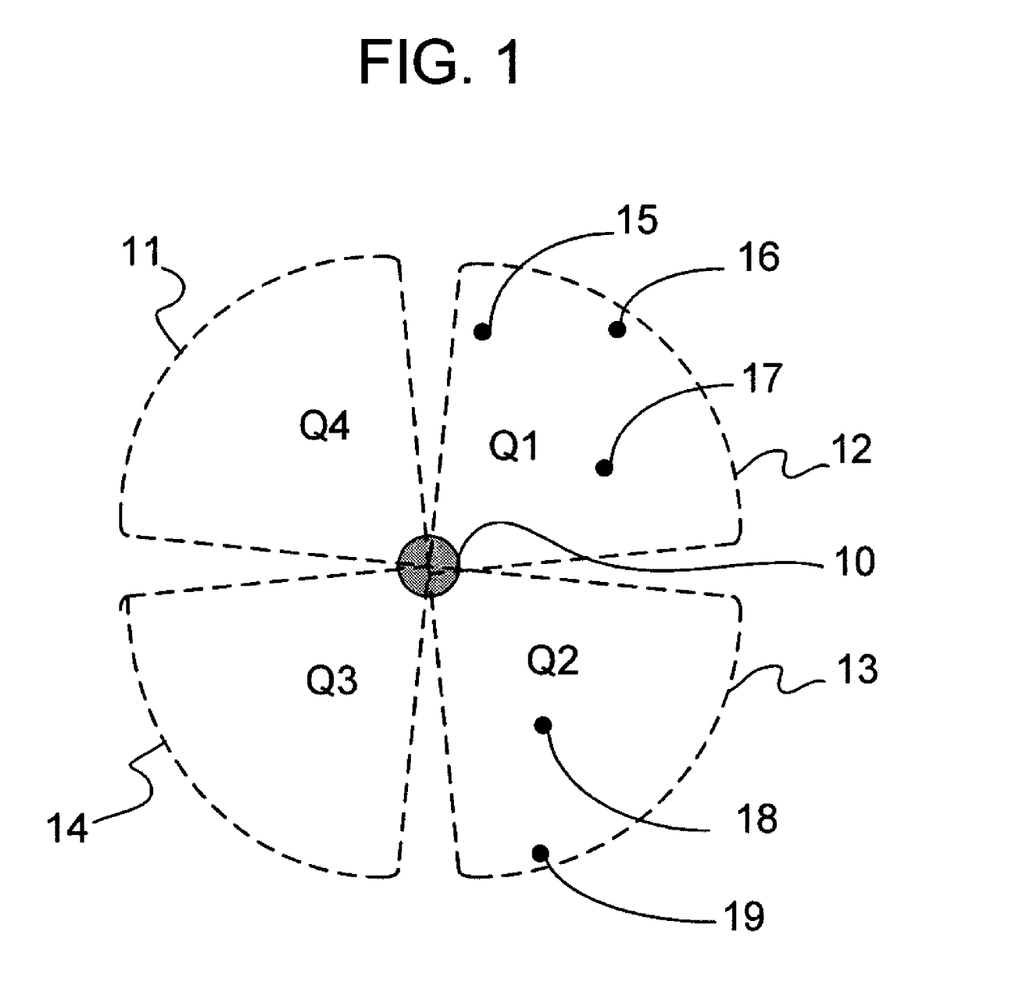
FIG. 1 illustrates a wireless network device with multiple sector antennas in accordance with various embodiments of the present invention.

FIG. 1 illustrates a wireless device (i.e., WLAN device) with four sector antennas in accordance with various embodiments of the present invention. In particular, the device 10 includes four sector antennas (not depicted) that are each facing different direction away from the device 10 and that are used to communicate in a wireless network. In some embodiments, sector antennas may have certain advantages over, for example, omnidirectional antennas. For example, sector antennas have been shown to have greater transmission and reception ranges and greater data throughput than omnidirectional antennas. The drawback of using sector antennas is that they typically have narrower beamwidths than omnidirectional antennas.

Each of the sector antennas is associated with one of four different quadrants 11, 12, 13, and 14. These quadrants correspondingly represent the communication (i.e., transmission and reception) ranges of the sector antennas. Note that although the quadrants 11, 12, 13, and 14 in this illustration do not appear to overlap, in some alternative embodiments, the quadrants 11, 12, 13, and 14 may overlap. Further, the device 10 may include fewer or greater number of sector antennas in other alternative embodiments.

Located near the device 10 and within the ranges of the sector antennas, for illustrative purpose, are five interference sources 15, 16, 17, 18, and 19. In some embodiments, the interference sources 15, 16, 17, 18, and 19 may be another WLAN device associated with another WLAN cell, a microwave over, a cordless telephone, a WiMAX device and/or other interference sources. As depicted, the five interference sources 15, 16, 17, 18, and 19 are all located within two quadrants, Q1 and Q2. As a result, only two of the four sector antennas that are associated with the two quadrants Q1 and Q2 may receive the interference signals generated by the interference sources 15, 16, 17, 18, and 19. In some alternative embodiments in which the quadrants (Q1, Q2, Q3, and Q4) overlap each other, an interference source may be able to generate interference signals that may be received by multiple sector antennas if the interference source is located in an overlapping portion of the quadrants.

According to various embodiments of the present invention, when the device 10 is ready to communicate with another device of a wireless network, the device 10 may elect to use for communication the sector antennas that are not receiving the interference from the interference sources. For example, in some embodiments, the device 10 may elect to not use the sector antenna associated with Q1 and the sector antenna associated with Q2 in order to communicate with another device of the wireless network. In doing so, the interferences produced by the interference sources 15, 16, 17, 18, and 19 may at least in part be avoided.

Alternatively, the device 10 may elect to use for communication only those sector antennas that are determined to receive interference levels that do not exceed a threshold. For example, the device 10 may use for communication one or both of the sector antennas associated with Q3 and Q4 as well as the sector antennas associated with Q1 and/or Q2 depending upon whether the interference received by the sector antennas Q1 and Q2 exceeds a threshold. These and other aspects of various embodiments of the present invention will be described in greater detail below.

Figure 2:
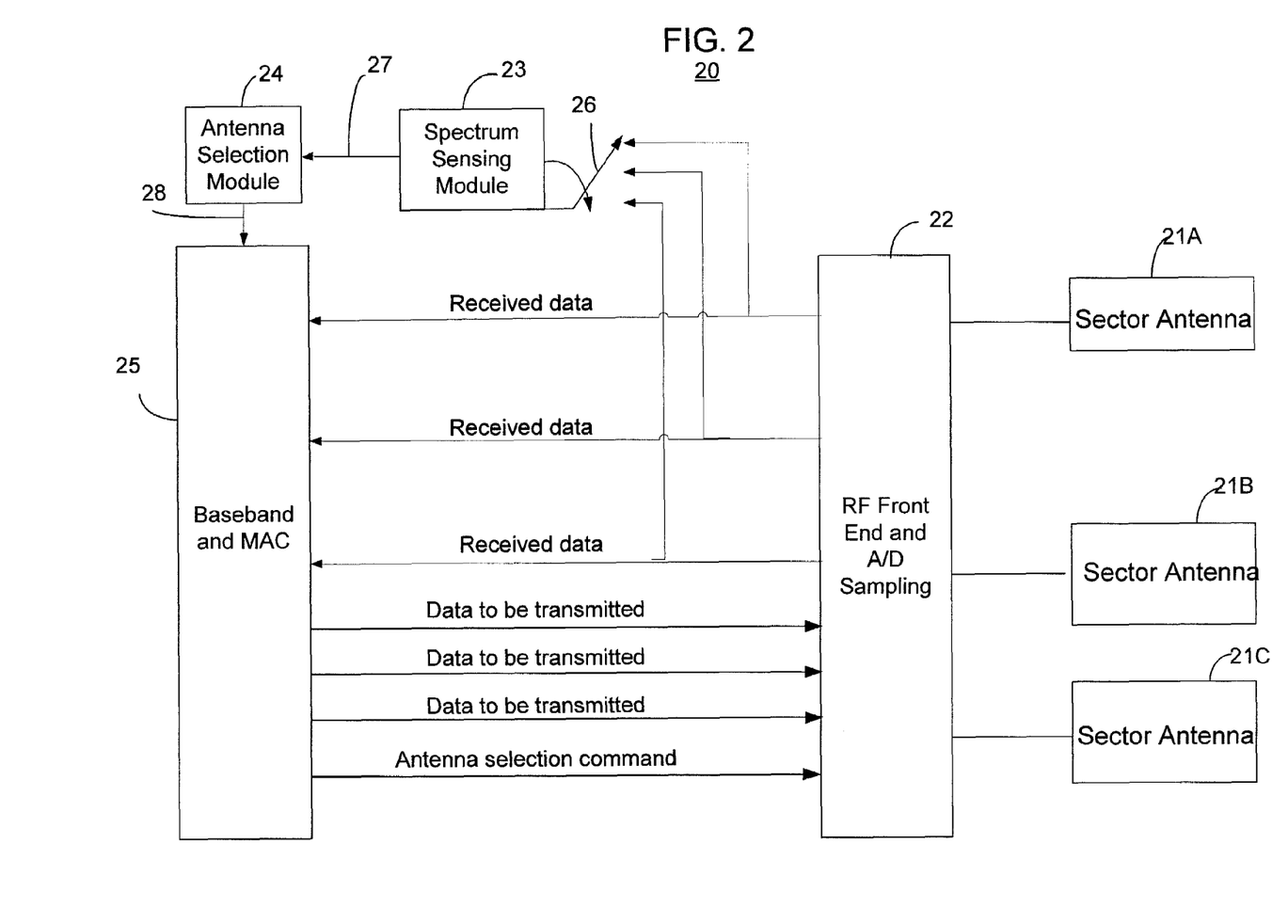
FIG. 2 illustrates a device for communicating with other devices of a wireless network designed to avoid at least in part one or more interferences from one or more interference sources in accordance with various embodiments of the present invention.

FIG. 2 illustrates a device for communicating with other devices of a wireless network designed to avoid at least in part one or more interferences from one or more interference sources in accordance with various embodiments of the present invention. The device 20, for the embodiments, includes a plurality of sector antennas 21A to 21C, a radio frequency (RF) front end and analog/digital (A/D) sampling block 22, a spectrum sensing module 23, an antenna selection module 24, a baseband and medium access control (MAC) block 25, and switches 26, coupled together as shown. Although three sector antennas 21A to 21C are depicted in FIG. 2, in alternative embodiments, fewer or greater number of sector antennas may be employed.

Each of the sector antennas 21A to 21C may be designed to communicate in a wireless network and may face outwardly away from the device 20 in different directions. As a result, in some embodiments, this may mean that the effective beamwidth (i.e., the combined beamwidth) of the sector antennas 21A to 21C is 360° degrees. In some embodiments, the sector antennas may be designed to receive communication signals received through one of the unlicensed frequency bands such as the 2.4 GHz band, the 5.0 GHz band, the 24 GHz band, or through one of the licensed frequency bands. In addition to being designed to communicate in a wireless network, the sector antennas 21A to 21C may also receive interference signals (or simply "interferences") from interference sources.

The spectrum sensing module 23 may be coupled to each of the sector antennas 21A to 21C, one sector antenna at a time via the switches 26. The spectrum sensing module 23 may be adapted to perform spectrum sensing by detecting or sensing one or more interferences from one or more interference sources received through each of the sector antennas 21A to 21C. Upon sensing the one or more interferences received through the sector antennas 21A to 21C, the spectrum sensing module 23 may be adapted to determine the interference type(s) of the one or more interferences. Again note that in some instances, at least two of the sector antennas 21A to 21C may receive interference from a single interference source such as when the sector antennas 21A to 21C have overlapping beamwidths and the interference source is located at an overlapping location.

The spectrum sensing module 23 may perform the spectrum sensing by sensing interference received through a particular frequency band such as the 2.4 GHz frequency band or some other frequency band. The spectrum sensing module 23 may determine the interference types of the interference sensed by determining the interference sources of the one or more interferences sensed through the sector antennas 21A to 21C including, for example, whether the one or more interferences are from a WLAN device, a microwave oven, a cordless telephone, and/or a WiMAX device. After sensing the one or more interferences received through the sector antennas 21A to 21C, the spectrum sensing module 23 may indicate to the antenna selection module 24 the detection or sensing of the one or more interferences received through each of the sector antennas 21A to 21C as indicated by reference 27. In some embodiments, the spectrum sensing module 23 may also indicate to the antenna selection module 24 the interference types of the one or more interferences detected or sensed.

As a result of the information provided by the spectrum sensing module 23, the antenna selection module 24 may be able to determine which of the sector antennas 21A to 21C is/are receiving interferences and the interference types of the interferences received. The antenna selection module 24 may then be adapted to select a subset of the sector antennas 21A to 21C for communicating with other devices of the wireless network based at least in part on the sensing operation performed by the spectrum sensing module 23 and the information provided by the spectrum sensing module 23 to the antenna selection module 24 in order to avoid at least in part one or more of the interferences received through the sector antennas 21A to 21C. This may mean excluding from the subset, one or more of the sector antennas receiving the interferences. After making the selection, the antenna selection module 24 may indicate to the Baseband and MAC block 25 its selection as indicated by reference 28.

For example, if one or more interferences are sensed through sector antenna 21A, then the antenna selection module 24 may only select sector antenna 21B and/or sector antenna 21C for communicating with the other devices of the wireless network. Alternatively, the antenna selection module 24 may select all of the sector antennas 21A to 21C including sector antenna 21A for communicating with the other devices depending upon the interference types of the one or more of the interferences sensed through antenna 21A. For example, the antenna selection module 24 may not necessarily exclude the use of sector antenna 21A for communication simply because the sector antenna 21A receives interferences from interference sources. Rather and as previously alluded to, the antenna selection module 24 may still select sector antenna 21A for communication if the one or more interferences (or the weighted interference of sector antenna 21A—to be discussed below) sensed through the sector antenna 21A is less than a threshold.

Note that in situations whereby two of the sector antennas 21A to 21C receives interference from a single interference source as described earlier, it may be possible for both or for only one of the two sector antennas 21A to 21C receiving the interference to be excluded from being used for communication depending upon, for example, the weighted interference of the two sector antennas 21A to 21C. Further note that although FIG. 2 depicts the baseband and MAC block 25 providing three data streams to be transmitted through the three sector antennas 21A to 21C, fewer data streams for transmission may be provided by the baseband and MAC block 25 when, for example, only one or two of the sector antennas 21A to 21C are to be actually used for transmitting signals. In some embodiments, the antenna selection module 24 may be implemented in software and/or hardware.

In still another example, if interferences are received and sensed through both sector antenna 21A and sector antenna 21B, then the antenna selection module 24 may select all of the sector antennas 21A to 21C for communication, select only two of the three sector antennas 21A to 21C for communication (i.e., sector antennas 21A and 21C or sector antennas 21B and 21C), or select only sector antenna 21C for communication, depending upon the interference and/or interference types of the interferences sensed. That is, in some embodiments, the antenna selection module 24 may be adapted to compare the interference or interferences received through each of the sector antennas 21A to 21C to a threshold or thresholds. If the interference or interferences sensed is/are greater than the threshold or thresholds, then the antenna selection module 24 may elect not to use the sector antenna or antennas receiving the interferences for communicating with the other devices of the wireless network.

In some embodiments, the antenna selection module 24 may be adapted to apply one or more weights to the interferences that may be sensed through each of the sector antennas 21A to 21C to determine a weighted interference for each of the sector antennas 21A to 21C. For example, in some embodiments, the weighted interference of each of the sector antennas 21A to 21C may be determined as follows:

Weighted interference for a sector antenna=[$w_1$×WLAN interference]+[$w_2$×microwave interference]+[$w_3$×cordless phone interference]+[$w_4$×WiMAX inference]+[$w_5$×other inference sensed]

wherein $w_x$ are weights for each type of interference

The weighted interference determined for each sector antenna 21A to 21C may be compared to a threshold. In some embodiments, if the weighted interference for a sector antenna 21A to 21C is determined to be greater than the threshold then the antenna selection module 24 may exclude that sector antenna from the subset of sector antennas to be used for communicating with the other devices of the wireless network. After determining the subset of sector antennas to be used for communication, the antenna selection module 24 may indicate to the baseband and MAC block 25 the selection of the subset of the plurality of sector antennas as indicated by reference 28. In various embodiments, the device 10 may include a physical storage medium for storing instructions that are designed to enable the device 10 to perform the various operations previously described.

Figure 3:
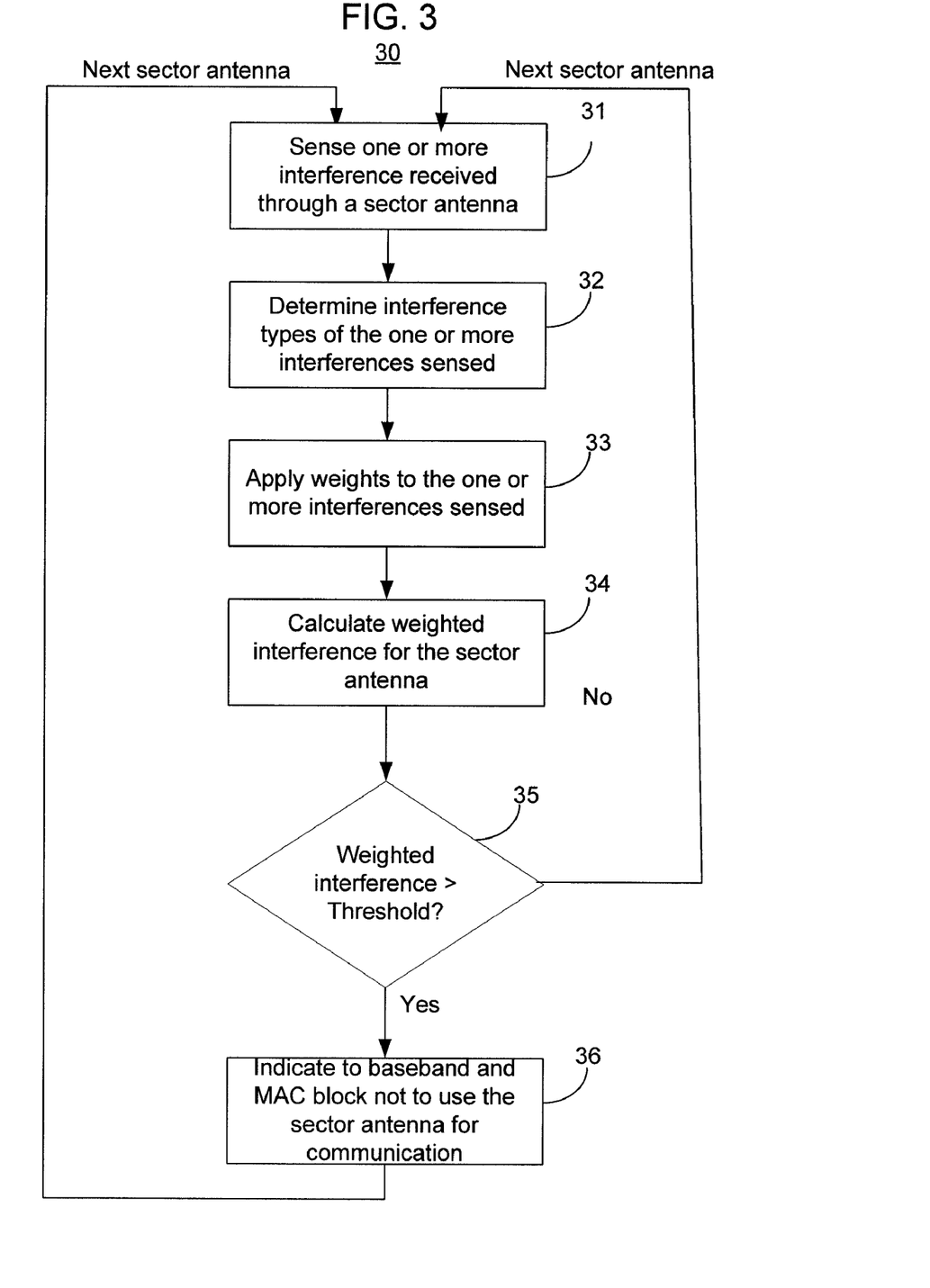
FIG. 3 illustrates a process for avoiding at least in part one or more interferences from one or more interference sources in accordance with various embodiments of the present invention.

FIG. 3 illustrates a process for selecting a subset of sector antennas from a plurality of sector antennas of a wireless network device for communicating with other devices of the wireless network in accordance with various embodiments of the present invention. In some embodiments, the process 30 may be implemented using the device 20 of FIG. 2. The process 30 may initially begin when one or more interferences from one or more interference sources is/are received and sensed through a first sector antenna of the plurality of sector antennas at 31. For example, in some embodiments, a first, a second, a third, and a fourth interferences from a first, a second, a third, and a fourth interference sources may be received through the first sector antenna. The interference type or types of the one or more interferences sensed may then be determined at 32. For example, if multiple interferences are received and sensed through the first sector antenna, then the interference type for each of the sensed interferences may be determined (e.g., whether the interferences are from a microwave oven, a cordless telephone, a WLAN device, a WiMAX device, and forth).

After determining the interference types of the one or more interferences sensed, weights may be applied to each of the one or more interferences based on the interference types of the one or more interferences at 33. For example, if two interferences from two different interference sources are received and sensed then two different weights may be applied to each of the two interferences. After applying the weights, a weighted interference for the first sector antenna may be calculated at 34. In some embodiments, the weighted interference may be calculated using, for example, the formula previously described.

The calculated weighted interference may then be compared to a threshold to determine whether the weighted interference is greater or less than a threshold at 35. If it is less than the threshold, then the process 30 may be repeated with a second sector antenna of the plurality of antennas. On the other hand, if the weighted interference is greater than the threshold, then an indication may be provided to the baseband and MAC block 25 to not to use the first sector antenna for communication in the wireless network at 36. In some embodiments, the indication provided to the baseband and MAC block 25 may further indicate that the first sector antenna is not to be used for communication for a predetermined amount of time. After providing the indication to the baseband and MAC block 25, the process 30 may be repeated for a second sector antenna of the plurality of sector antennas.

The process 30 may then be repeated over and over until each of the sector antennas of the plurality of sector antennas has been checked for interferences. By performing the process 30 over and over again for each of the plurality of sector antennas, a subset of the plurality of sector antennas may be selected for communicating with the other devices of the wireless network in order to avoid, at least in part, the interferences sensed. In some embodiments, the subset selected may exclude one or more of the sector antennas determined to have a weighted interference greater than a threshold. As a result, one or more interference from one or more interference sources may at least in part be avoided.

Another way to view the process 30 is that as a result of repeatedly performing the process 30 for each of a plurality of sector antennas of a wireless device, such a device may be allowed to determine or sense which of the plurality of sector antennas is receiving interference from a specific interference source, and to select a subset of the plurality of sector antennas for communicating with other devices of a wireless network based at least in part on such sensing. For example, such a device may sense a first interference from a first interference source received through a first one or more of the plurality of sector antennas. Note again that interference from a single interference may be received by more than a single sector antenna. Based at least in part on the sensing of the first interference received through the first one or more of the plurality of sector antennas, the device may select a subset of the plurality of sector antennas for communication in the wireless network to avoid, at least in part, the first interference. The selection may be further based on the sensing of additional interferences from other interference sources received through, for example, the other sector antennas of the plurality of sector antennas. For example, the selection may be further based on the sensing of a second, a third, and a fourth interference received through a second, a third, and a fourth one or more of the plurality of sector antennas in order to avoid, at least in part, the second, the third, and fourth interference.

Figure 4:
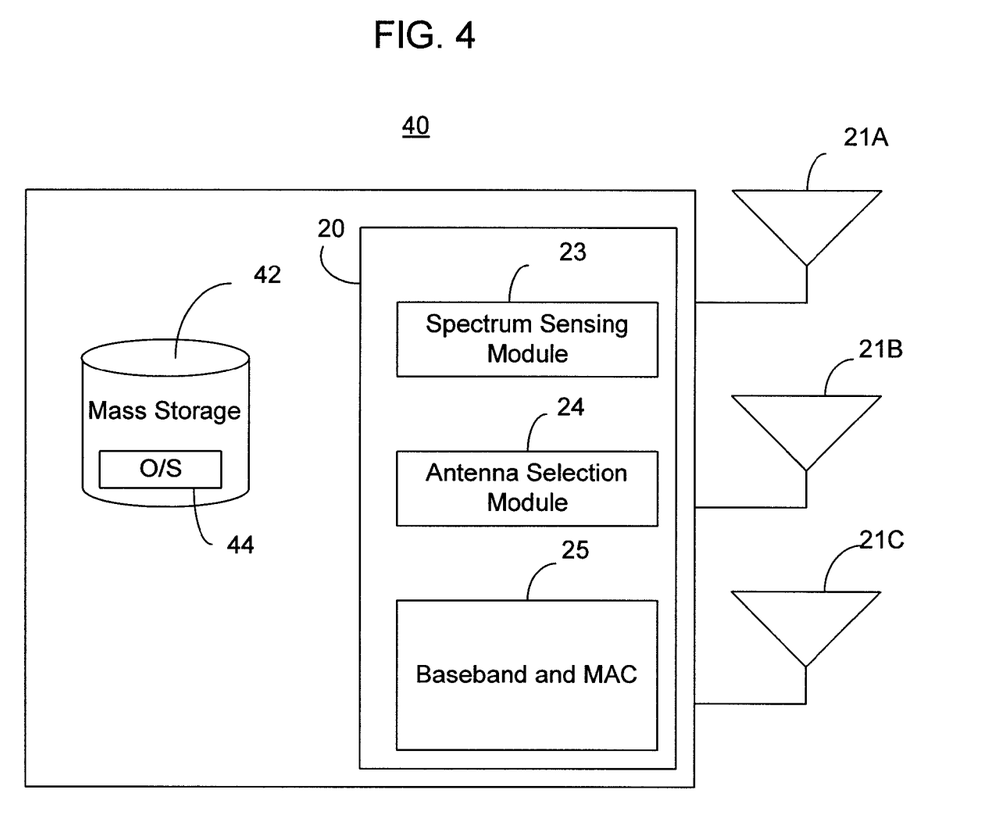
FIG. 4 illustrates a system suitable for practicing the present invention, in accordance with various embodiments.

FIG. 4 illustrates a system in accordance with various embodiments of the invention. For the embodiments, the system 40 includes a mass storage device 42 having an operating system 44, and the device 20 of FIG. 2 including a spectrum sensing module 23, an antenna selection module 24, a baseband and MAC block 25, and a plurality of sector antennas 21A to 21C, coupled to each other as shown. Spectrum sensing module 23 and antenna selection module 24 are incorporated with the teachings of the present invention as earlier described. In some embodiments, the system 40 may be a desktop computer, a laptop computer, a set-top box, a personal digital assistant (PDA), a web tablet, a pager, a text messenger, a game device, a smart appliance, or a wireless mobile phone.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
    sensing, by a device of a wireless network, a first interference from a first interference source, the first interference being received by first one or more of a plurality of sector antennas of the device;
    sensing, by the device, a second interference from a second interference source, the second interference being received by the first one or more of the plurality of sector antennas;
    applying a first and a second weight to the first and the second interference, respectively, to determine a first weighted interference of the first one or more of the plurality of sector antennas; and
    selecting a subset of the plurality of sector antennas for use to communicate with other devices in the wireless network, based at least in part on the first weighted interference, to avoid at least in part the first interference and/or the second interference during said communicate;
    wherein said selecting is performed by excluding from the subset the first one or more of the plurality of sector antennas if the first weighted interference is greater than a threshold.

2. The method of claim 1, further comprising:
    sensing, by the device, a third interference from a third interference source, the third interference being received by second one or more of the plurality of sector antennas;
    wherein said selecting is further based on said sensing of the third interference, to further avoid at least in part the third interference during said communicate.

3. The method of claim 2, further comprising:
    sensing by the device a fourth and a fifth interference from a fourth and a fifth interference source, respectively, the fourth interference and the fifth interference being received by respective third and fourth one or more of the plurality of sector antennas;
    wherein said selecting is further based on said sensing of the fourth and fifth interference, to further avoid at least in part the fourth and fifth interference during said communicate.

4. The method of claim 3, further comprising:
    determining the first, second, third and fourth one or more of the plurality of sector antennas receiving the respective first, third, fourth, and fifth interferences;
    wherein said selecting comprises selecting a subset of the plurality of sector antennas that does not include one or more of the determined one(s) of the plurality of sector antennas receiving the respective first, third, fourth, and fifth interferences.

5. The method of claim 1, further comprising:
    determining the first one or more of the plurality of sector antennas receiving the first interference;
    wherein said selecting comprises selecting a subset of the plurality of sector antennas that does not include at least one of the first one or more of the sector antennas determined to be receiving the first interference.

6. The method of claim 1, further comprising:
    determining an interference type of the first interference;
    wherein said selecting is further based at least in part on the determined interference type of the first interference.

7. The method of claim 1, wherein said sensing of the first or the second interference further comprises spectrum sensing, by the device, the first or the second interference received through a frequency band; and
    wherein said selecting is further based at least in part on said spectrum sensing.

8. The method of claim 7, wherein said frequency band is a 2.4 GHz band.

9. The method of claim 1, further comprising:
    sensing a third and a fourth interference from a third and a fourth interference source, respectively, received by the first one or more of the plurality of sector antennas; and
    applying a third and a fourth weight to the third and the fourth interference to determine the first weighted interference of the first one or more of the plurality of sector antennas.

10. The method of claim 1, further comprising:
sensing a third and a fourth interference from a third and a fourth interference source, respectively, received by a second one or more of the plurality of sector antennas;
applying a third and a fourth weight to the third and the fourth interference, respectively, to determine a second weighted interference of the second one or more of the plurality of sector antennas; and
excluding from the subset the second one or more of the plurality of sector antennas if the second weighted interference is greater than the threshold.

11. An article of manufacture, comprising:
a physical storage medium; and
a plurality of executable instructions stored in the physical storage medium designed to program a device to enable the device to:
determine a first weighted interference by applying a first weight to a first interference sensed from a first interference source by one or more of a plurality of sector antennas of the device, and applying a second weight to a second interference sensed from a second interference source by the one or more of the plurality of sector antennas; and
select a subset of the plurality of sector antennas of the device for use to communicate in a wireless network based at least in part on the first weighted interference;
wherein said selecting is performed by excluding from the subset the one or more of the plurality of sector antennas if the first weighted interference is greater than a threshold.

12. The article of claim 11, wherein said instructions are adapted to enable said device to perform a determination of interference type(s) of the first interference and/or the second interference to facilitate said selection of a subset of the plurality of sector antennas to communicate in the wireless network; and
wherein said instructions are adapted to enable said device to select a subset by excluding one or more of the sector antennas receiving the first interference and/or the second interference.

13. The article of claim 12, wherein said instructions are adapted to enable said device to perform said determination by determining whether the first interference and/or the second interference is/are from a wireless local area network (WLAN) device, a microwave oven, a cordless telephone, and a Worldwide Interoperability for Microwave Access (WiMAX) device.

14. An apparatus, comprising:
a plurality of sector antennas;
a spectrum sensing module coupled to the sector antennas to sense one or more interferences received by one or more of the plurality of sector antennas; and
an antenna selection module coupled to the spectrum sensing module to:
determine a first weighted interference by applying a first weight to a first interference sensed from a first interference source by one or more of the plurality of sector antennas, and
applying a second weight to a second interference sensed from a second interference source by the one or more of the plurality of sector antennas, and
select a subset of the plurality of sector antennas to communicate with other devices in a wireless network based at least in part on the first weighted interference;
wherein said antenna selection module is further configured to compare the first weighted interference of the selected sector antenna(s) to a threshold; and to select a subset of the plurality of sector antennas excluding from the subset sector antenna(s) having the first weighted interference if the first weighted interference is greater than a threshold.

15. The apparatus of claim 14, wherein said antenna selection module is adapted to determine which one(s) of the plurality of sector antennas receives the first interference and the second interference and to select the subset of the plurality of sector antennas further based at least in part on said determination.

16. The apparatus of claim 14, wherein said spectrum sensing module is adapted to determine interference type(s) of the first interference and/or the second interference sensed, and said antenna selection module selects the subset of the plurality of sector antennas further based at least in part on said determined interference type(s) of the first interference and/or the second interference.

17. The apparatus of claim 16, wherein said spectrum sensing module is further adapted to determine whether the first interference and/or the second interference is/are interference(s) from a wireless local area network (WLAN) device, a microwave oven, a cordless telephone, and/or a Worldwide Interoperability for Microwave Access (WiMAX) device.

18. The apparatus of claim 16, wherein said antenna selection module is adapted to apply the one or more weights to the first interference and/or the second interference based on said determined interference type(s) of the first interference and/or the second interference.

19. A system, comprising:
a mass storage device having an operating system therein;
an apparatus coupled to the mass storage device, the apparatus including:
a plurality of sector antennas;
a spectrum sensing module coupled to the sector antennas to sense one or more interferences received by one or more of the plurality of sector antennas; and
an antenna selection module coupled to the spectrum sensing module to:
determine a first weighted interference by applying a first weight to a first interference sensed from a first interference source by one or more of the plurality of sector antennas, and applying a second weight to a second interference sensed from a second interference source by the one or more of the plurality of sector antennas, and
select a subset of the plurality of sector antennas to communicate with other apparatuses in a wireless network based at least in part on the first weighted interference;
wherein said antenna selection module is further configured to compare the first weighted interference of the selected sector antenna(s) to a threshold; and to select a subset of the plurality of sector antennas excluding from the subset sector antenna(s) having the first weighted interference if the first weighted interference is greater than a threshold.

20. The system of claim 19, further comprising a baseband and medium access control (MAC) block coupled to the antenna selection module to receive said selection.

21. The system of claim 19, wherein the system is one selected from the group consisting of a desktop computer, a laptop computer, a set-top box, a personal digital assistant (PDA), a web tablet, a pager, a text messenger, a game device, a smart appliance, or a wireless mobile phone.

* * * * *